May 5, 1925.  
W. M. DECKER  
CUSHIONED VEHICLE WHEEL  
Filed Aug. 20, 1923  
1,536,817
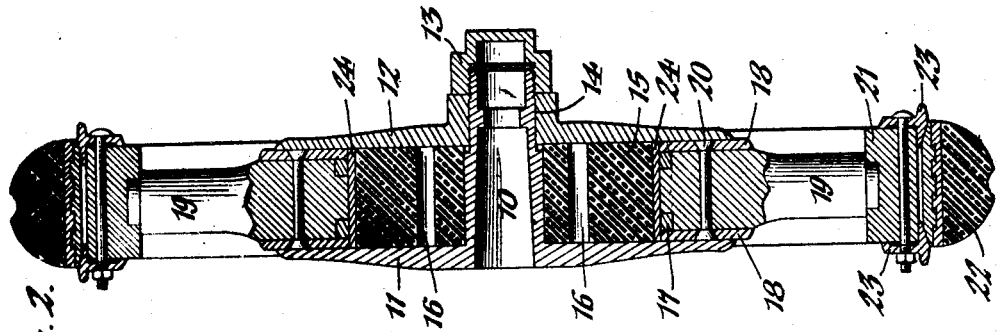
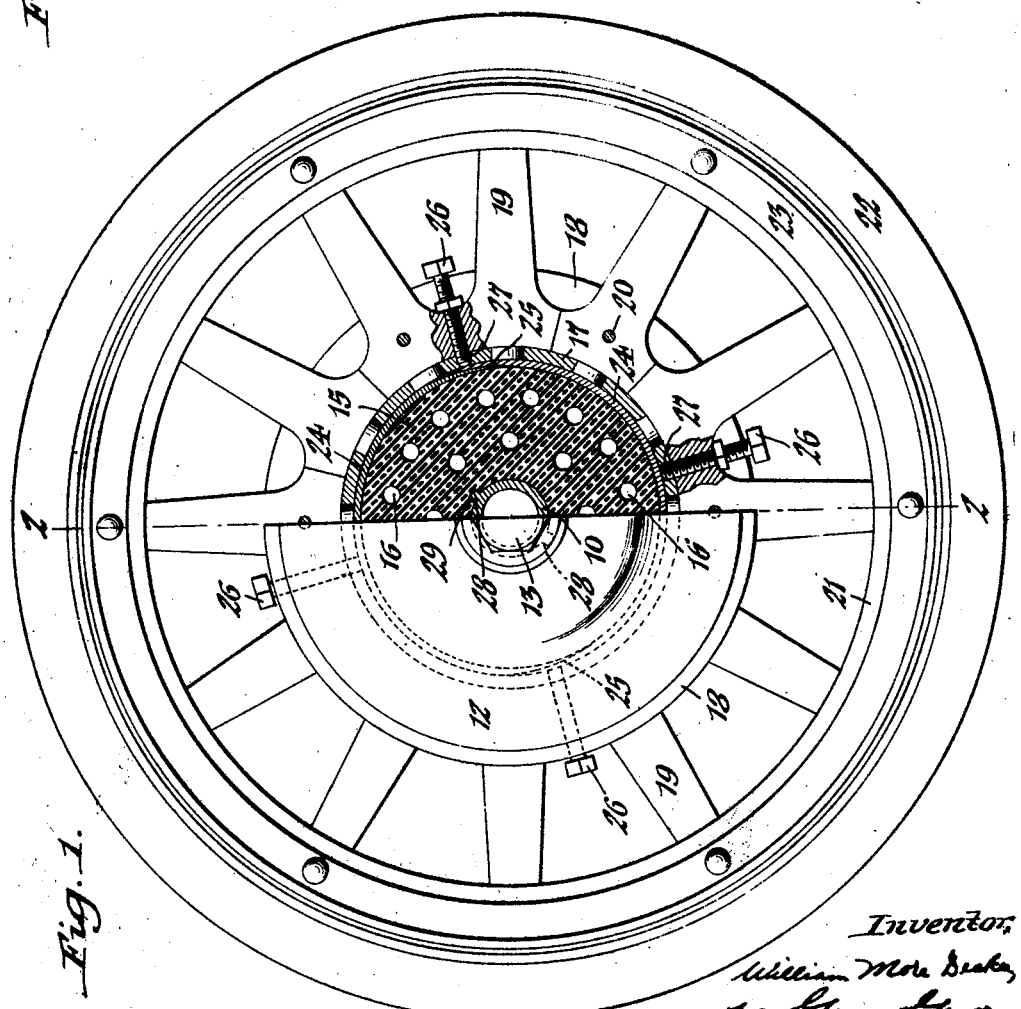
Inventor,
William Mote Decker,
by Geyer & Geyer
Attorneys Patented May 5, 1925.

1,536,817

UNITED STATES PATENT OFFICE.

WILLIAM MORE DECKER, OF BUFFALO, NEW YORK.

CUSHIONED VEHICLE WHEEL.

Application filed August 20, 1923. Serial No. 658,260.

*To all whom it may concern:*

Be it known that I, WILLIAM MORE DECKER, a citizen of the United States, residing at Buffalo, in the county of Erie and State of New York, have invented new and useful Improvements in Cushioned Vehicle Wheels, of which the following is a specification.

This invention relates generally to a vehicle wheel but more particularly to a resilient or cushioned wheel primarily intended for automobiles and auto-trucks.

Its principal object is the provision of an improved wheel of this character which is free from the well known objections of pneumatic-tired wheels and at the same time possesses the necessary degree of resilience to absorb the shocks and jolts incident to travel over uneven roadways.

Another object of the invention is to provide a cushioned wheel having simple and convenient means for adjusting or regulating the compression of the cushion or resilient member and taking up wear.

In the accompanying drawings, Figure 1 is a side elevation partly in section of a vehicle wheel embodying my improvements. Figure 2 is a transverse section thereof on line 2—2, Figure 1.

Similar characters of reference indicate corresponding parts in both views.

The rigid body-portion of the wheel may be of any suitable construction, but preferably comprises a metallic hub or thimble 10 carrying a pair of spaced parallel disks or plates 11, 12. One of these disks, say the inner disk 11, may be formed integral with the hub, as shown in Fig. 2, while the other disk 12 is removably mounted on the hub and held thereon by a clamping nut 13. Said removable disk is suitably held against turning on the hub, for example, by providing the latter with one or more flattened sides 14 which engage a correspondingly shaped bore of the disk.

Confined and supported between the disks 11, 12 is a circular resilient core member or cushion 15 which is preferably constructed of rubber and somewhat smaller in diameter than said disks. To reduce the weight of this cushion, as well as increase its resiliency, it may be provided with transverse perforations 16 of any suitable size, shape and number. It is to be understood, however, that these perforations are optional and may be omitted, if desired.

Encircling the cushion and concentric therewith is a channel-shaped member consisting of a base-ring 17 and parallel side plates or rings 18 which abut at their inner sides against the opposite edges of said base-ring and whose inner edges are substantially flush with the inner face of the latter, as shown in Fig. 2. This channel-shaped member is confined between the disks 11, 12 and the outer sides of its plates 18 bear against the opposing inner sides of said disks. The inner ends of the spokes 19 are seated in the base-ring 17 and securely held in place by transverse bolts or rivets 20 whose heads are flush with the outer faces of the plates 18. The outer ends of the spokes are secured to the rim or felly 21 in the usual manner and applied to the latter is a traction member preferably consisting of a solid rubber tire 22 held thereon by locking rings 23 or any other suitable or well known means.

Means are provided for adjusting or regulating the cushioning action of the resilient core or cushion 15, according to the load borne by it or other conditions which affect the riding qualities of the wheel. For this purpose, the preferred means include an adjustable band or ring composed of two opposing semi-circular sections 24, 24, constructed of spring steel or other appropriate material, which encircle said cushion, being arranged between the latter and the opposing concentric face of the base-ring 17, as shown in Fig. 1. The opposing ends of these band-sections meet in overlapping joints and may be tapered for a suitable distance, as shown at 25, to form a smooth, flush joint. In the example shown, the adjustment of said band-sections toward and from each other to compress or permit expansion of the cushion, is effected by radial adjusting screws 26 which may be located between adjacent spokes, and which extend through the base-portions of the spokes and threaded-openings 27 in the base ring 17, the inner ends of said bolts abutting against the outer faces of the band-sections. In the drawings, four of such adjusting-screws are shown, two of which are located opposite the jointed ends of the band-sections, while the other two are located substantially equidistant between the two first-named.

By this arrangement of the adjusting devices 26, uniform adjustment of all portions of the band-sections 24, 24 can be readily effected with a correspondingly equal and uniform compression or expansion of the cushion 15, permitting the latter to be regulated in accordance with the load imposed on the wheel.

To prevent creepage or slippage of the resilient hub-ring 15 on the metallic hub 10, said hub-ring is suitably interlocked therewith, for instance, by providing the hub with one or more lugs or projections 28 which enter corresponding grooves or recesses in the hub-ring bore.

The improved vehicle wheel is free from pneumatic parts which are liable to become punctured; it possesses the necessary resilience for comfortable and easy riding, and it is serviceable under all conditions without the expense and annoyance incident to the use of pneumatic tires.

It is obvious, that while the invention is herein shown as applied to a spoke-wheel, the same is also applicable to wheels of the disk type.

I claim as my invention:

1. A cushioned wheel, comprising a hub, a cushion surrounding said hub, a rigid annular member surrounding said cushion, an adjustable band interposed between said cushion and said rigid member, and adjusting devices carried by said rigid member and engaging said adjustable band.

2. A cushioned wheel, comprising a hub, a rim, a cushioning member interposed between said hub and said rim, a sectional band encircling said cushioning member, and means for adjusting said band-sections to expand or contact said cushioning member.

3. A cushioned wheel, comprising a hub, a rim, a cushioning member interposed between said hub and said rim, a rigid member spaced from and encircling said cushioning member, a sectional spring-band applied to the latter in the space between it and said rigid member, and adjusting-screws carried by said rigid member and engaging said sectional band.

4. A cushioned wheel, comprising a hub, a rim, a cushioning member interposed between said hub and said rim, a rigid member spaced from and encircling said cushioning member, and means for adjusting the compression of said cushioning member, including a pair of opposing substantially semi-circular band-sections applied to the cushioning member in the space between it and said rigid member, and radial adjusting-screws carried by said rigid member and engaging said band-sections.

5. A cushioned wheel, comprising a hub carrying spaced disks, a rim, a ring encircling the hub and arranged between said disks, means connecting said ring with said rim, a cushion of rubber applied to said hub between said disks, a sectional spring-band interposed between said cushion and said ring, the opposing ends of said band-sections meeting in overlapping joints, and radial adjusting screws passing through said ring and abutting against the sectional band at points opposite and intermediate the joints thereof.

WILLIAM MORE DECKER.